Patented May 12, 1953

2,638,403

UNITED STATES PATENT OFFICE 2,638,403

DYEING OF NYLON WITH SULFONAMIDE AZO DYES

Ernest Stead, Alec Murray, and Donald Burtonshaw, Leeds, England, assignors to Yorkshire Dyeware and Chemical Company Limited, Leeds, England, a British company No Drawing. Application September 15, 1949, Serial No. 115,956. In Great Britain January 20, 1949

2 Claims. (Cl. 8—41)

This invention relates to the manufacture of azo dyes and to the dyeing of synthetic thermoplastic materials, especially nylon, therewith.

It is well known to use for the dyeing of cellulose acetate certain azo dyes applied from aqueous dispersion. Among the azo dyes which have been found particularly useful for this purpose are those obtained by coupling diazotized paranitraniline (if desired, containing other nuclear substituents such as chlorine or bromine) with an aromatic amine having a position para to an amino group unoccupied, both components being free from carboxylic acid or sulphonic acid groups which constitute undesired water-solubilizing groups. An improved result is often secured when the amino group of the coupling component contains alkyl substituents and it is also known that azo dyes which are of low volatility and therefore particularly suitable for printing are obtained when the said amino group contains a hydroxyalkyl substituent or two hydroxyalkyl substituents. Such dyes may be represented by the general formula $$NO_2\text{---}A\text{---}N:N\text{---}B\text{---}N(R_1)(R_2)$$

where

A represents a para phenylene group, substituted or not but free from carboxylic acid or sulphonic acid groups, B represents a para phenylene or 1:4-naphthylene group, substituted or not but free from carboxylic acid or sulphonic acid groups, $R_1$ represents hydrogen or an alkyl group or a hydroxyalkyl group, and $R_2$ represents a hydroxyalkyl group.

When dyes of this general formula are used on cellulose acetate, satisfactory colourations are obtained but when they are used on other synthetic thermoplastic materials such as nylon they generally give colourations which are much less bright and often of a different shade. For example, the dyestuff of the formula $$(p)NO_2\text{---}C_6H_4\text{---}N:N\text{---}C_6H_4\text{---}NH_2(p)$$

gives a bright orange colouration on cellulose acetate but on nylon the colour is red and rather dull. It has indeed been found very difficult to produce a bright orange colouration on nylon in a satisfactory manner.

One object of the present invention is to produce new azo dyestuffs which will dye nylon and other synthetic thermoplastic materials including cellulose acetate.

Another object of the invention is to produce azo dyeings on nylon of good light fastness.

Another object of the invention is to produce bright orange and scarlet azo dyeings on nylon.

Other objects will be apparent from the following description.

We have found that the dyes of the general formula $$(R_3)(R_4)N\text{---}SO_2\text{---}D\text{---}N:N\text{---}B\text{---}N(R_5)(R_6)$$

where

B has the meaning given above,

D represents a phenylene or naphthylene group, substituted or not but free from carboxylic acid, sulphonic acid or further sulphonamide groups.

$R_3$ and $R_4$ represent hydrogen atoms or alkyl or hydroxyalkyl groups and may be the same or different or may together represent an alkylene group, $R_5$ represents a hydrogen atom or an alkyl group or a monohydroxyalkyl or dihydroxyalkyl group and $R_6$ represents a monohydroxyalkyl or dihydroxyalkyl group (which may be mono sulphated) or a β-hydroxypropylene group connected to the carbon atom in the ortho position of the group B, give extremely satisfactory dyeings on nylon as well as on other synthetic thermoplastic materials including cellulose acetate.

These dyes, we have found, can easily be made by diazotising a compound of the formula $$(R_3)(R_4)N\text{---}SO_2\text{---}D\text{---}NH_2$$

where D, $R_3$ and $R_4$ have the meanings given above, and coupling it with a compound of the formula $$H\text{---}B\text{---}N(R_5)(R_6)$$

where B, $R_5$ and $R_6$ have the meanings given above.

These dyes, as a rule, give colourations which are brighter than those obtained by coupling the same coupling component with diazotized paranitraniline and in many cases they give colourations of similar shade on cellulose acetate and nylon. It has been found possible to make dyes conforming to this general formula which will produce orange and scarlet shades on nylon, of a brightness hitherto only obtainable with dyes of other classes e. g. acid dyes. It has also been found possible to make dyes conforming to this general formula which give orange shades on cellulose acetate and are of very low volatility.

Dyes of the general formula last given wherein B is a 1:4 naphthylene group, substituted or not but free from carboxylic acid sulphonic acid or further sulphonamide groups, give dyeings on cellulose actate of poor light fastness but give dyeings on nylon of good light fastness. This is surprising since with the dispersed dyes customarily used for the dyeing of cellulose acetate and nylon, the dyeings on nylon is usually of lower light fastness than the dyeing with the same dye on cellulose acetate.

Many years ago it was proposed to dye acetate silk with azo dyes obtained by diazotizing sulphanilamide and coupling with basic coupling components such as aminocresol ether, m-toluidine or α-naphthylamine. A little later it was suggested to dye acetate silk with unsulphonated azo dyes containing a dioxydialkylamino group. So far as we are aware, however, it has not hitherto been proposed to make the dyes of the present invention, still less to use them, for the dyeing of synthetic thermoplastic materials such as nylon.

While the dyes of the present invention are particularly useful for dyeing synthetic linear polyamides (nylon) by the customary dispersion process, they are also suitable for dyeing other synthetic thermoplastic materials by the same process, e. g. plasticised and unplasticised cellulose ethers and esters such as cellulose acetate, vinyl polymers and copolymers, synthetic polyesters having a multiplicity of structural units linked in series by —COO— groups, such as the compound made from terephthalic acid and ethylene glycol and sold under the trade-mark "Terylene," or polymerised methyl methacrylate.

The synthetic thermoplastic materials may be in the form of filaments or films. Thus, they may consist of yarns formed from continuous filaments or cut staple or of fabrics woven or knitted from such yarns or may consist of sheets or strips of non-filamentous material formed by extrusion or casting.

The following examples illustrate how the dyes of the present invention may be made and used. All parts are by weight.

*Example I*

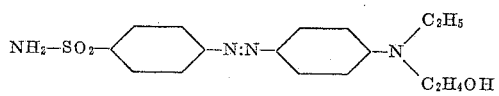

43 parts of aniline-p-sulphonamide(sulphanilamide) are dissolved in 120 parts of 28° Tw. hydrochloric acid and 800 parts of water, cooled to 0–5° C., and diazotized by addition of 175 parts of 10% aqueous sodium nitrite. The solution so obtained is added to a stirred solution of 42 parts N-ethyl-N-beta-hydroxyethylaniline in 500 parts of water containing 33 parts of 28° Tw. hydrochloric acid and ice to maintain the temperature below 10° C. 40 parts of sodium acetate are then added, and coupling completed by addition of sufficient 25% caustic soda solution to neutralize the acidity. The precipitated dye is filtered off, milled with a suitable dispersant, and dried.

The above dyestuff yields very bright yellowish orange shades which are non-volatile on cellulose acetate rayon or nylon when applied by the following method:

2 parts of dyestuff are dispersed in 4000 parts of a 2 gm. per litre soap solution. 100 parts of material to be dyed are entered at a temperature of 40° C., the temperature raised to 70–80° C., and maintained for ½ to 1 hour to complete the dyeing.

*Example II*

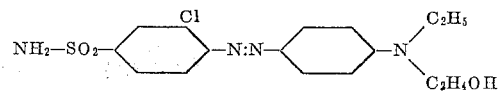

52 parts by weight of o-chloroaniline-p-sulphonamide are dissolved in 120 parts of 28° Tw. hydrochloric acid and 800 parts of water, cooled to 0° C. and diazotised by addition of 175 parts of 10% aqueous sodium nitrite. The solution so obtained is added to a stirred solution of 42 parts N-ethyl-N-beta-hydroxyethylaniline in 500 parts of water containing 33 parts of 28° Tw. hydrochloric acid and ice to maintain the temperature below 10° C. Little coupling occurs at this stage, but on adding 40 parts of sodium acetate, and sufficient 25% caustic soda solution to neutralise the acidity, the colour separates as a bright scarlet precipitate. It is filtered off, milled to a fine particle size, mixed with a suitable dispersing agent, e. g., the condensation product of cresol sulphonic acid and formaldehyde, and dried. The dyestuff so obtained yields very bright reddish orange shades which are non-volatile on cellulose acetate. The shades produced on nylon are very slightly redder, but equally as bright. On both fibres the dyeings can be discharged to pure white by reduction methods well known to textile printers.

*Example III*

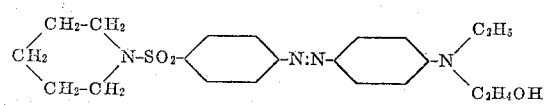

By reacting aniline-p-sulphonyl chloride with piperidine, aniline-p-sulphonpiperidine, m. p. 156° C., is obtained. By diazotising 1 molecular proportion of this and coupling with 1 molecular proportion of N-ethyl-N-beta-hydroxyethylaniline, a yellowish-orange dye, similar to that described in Example I, is produced.

*Example IV*

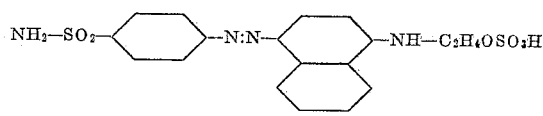

By treating 187 parts of N-hydroxyethyl-1-naphthylamine with 420 parts of sulphuric acid at 80° C., the soluble sulphato derivative is formed. This is neutralised with caustic soda solution, 212 parts sodium carbonate added, cooled to 0° C. and coupled with a diazo solution prepared from 170 parts sulphanilamide as described in Example I. The dye so produced is a dark red powder, fairly soluble in hot water. It yields bright scarlet shades on nylon, of good fastness to light and washing. On cellulose acetate it yields bright yellowish-scarlets, which are, however, very fugitive to the action of light.

Example V

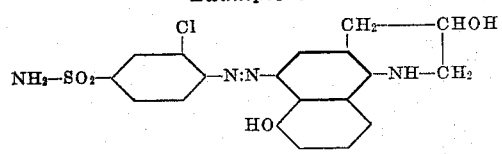

A solution is prepared of 252 parts of the hydrochloride of 3:6′-dihydroxy-1:2:3:4-tetrahydro-1′:2′:7:8-benzoquinoline:

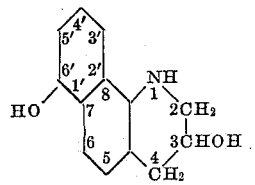

Cooled to 0° C. and mixed with an ice cold diazo solution prepared from 206 parts o-chloroaniline-p-sulphonamide; a brown precipitate appears. As the pH of the solution is increased by gradual addition of sodium acetate and caustic soda solution, the precipitate becomes violet in colour. The mixture is finally adjusted to pH 7 and the dye filtered off. The paste so obtained is milled to a fine particle size, mixed with a suitable dispersing agent, and dried. The product yields blue shades on nylon, dischargeable to white by the reduction in use by textile printers.

By the methods described in the foregoing examples, using appropriate starting materials, numerous other dyestuffs can be made within the scope of the present invention. The following table gives diazotisable components and coupling components suitable for making such dyestuffs and shows the shade of dyeing obtained on nylon.

| Example | Diazotised Sulphonamide | Coupling Component | Shade on Nylon |
|---|---|---|---|
| 6 | Sulphanilamide | NN di(hydroxyethyl)aniline | Yellowish orange. |
| 7 | do | NN-di(hydroxyethyl)-m-toluidine. | Orange. |
| 8 | do | N-ethyl-N-glycerylaniline | Yellowish orange. |
| 9 | do | N-ethyl-N-sulphato-hydroxy-ethylaniline. | Do. |
| 10 | do | N-hydroxyethyl-1-naphthylamine. | Scarlet. |
| 11 | O-Chloroaniline-p-sulphonamide. | 3:6′-dihydroxy-1:2:3:4-tetrahydro-1′:2′:7:8-benzoquinoline. | Violet. |
| 12 | 2-methoxyaniline-5-sulphonamide. | N-ethyl-N-hydroxyethyl-aniline | Golden yellow. |
| 13 | do | NN di(hydroxyethyl)aniline | Yellow. |
| 14 | Aniline-p-Sulphondiethylamide. | N-ethyl-N-hydroxyethyl-aniline | Yellowish orange. |
| 15 | Aniline-p-sulphondi(hydroxyethyl)amide. | do | Do. |
| 16 | O-Chloroaniline-p-sulphonamide. | N-hydroxyethyl-1-naphthylamine. | Crimson. |
| 17 | O-nitroaniline-p-sulphonamide. | N-ethyl-N-hydroxyethylaniline. | Scarlet. |
| 18 | 2-methylaniline-5-sulphonamide. | do | Yellowish orange. |
| 19 | do | N-hydroxyethyl-1-naphthylamine. | Yellowish scarlet. |
| 20 | 4-methylaniline-2-sulphonamide. | do | Reddish orange. |
| 21 | do | N-ethyl-N-hydroxyethyl-aniline. | Golden yellow. |
| 22 | 1-naphthylamine-4-sulphonamide. | N-hydroxyethyl-1-naphthylamine. | Red. |

We claim:
1. The process of dyeing nylon which comprises bringing it into contact with an aqueous dispersion of a dyestuff of the general formula

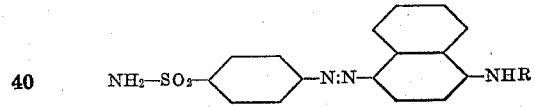

where R represents a radical selected from the group consisting of monohydroxyalkyl and monosulphatomonohydroxyalkyl radicals.

2. The process of dyeing nylon which comprises bringing it into contact with an aqueous suspension of a dyestuff of the formula

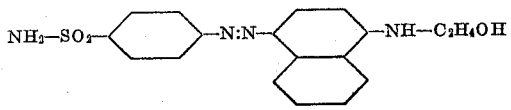

ERNEST STEAD.
ALEC MURRAY.
DONALD BURTONSHAW.

References Cited in the file of this patent

UNITED STATES PATENTS

| Number | Name | Date |
|---|---|---|
| 1,673,301 | Reddelien et al. | June 12, 1928 |
| 1,802,204 | Eichwede | Apr. 21, 1931 |
| 1,935,624 | Ellis | Nov. 21, 1933 |
| 1,975,160 | Jordan | Oct. 2, 1934 |
| 2,085,037 | Mietzsch et al. | June 29, 1937 |
| 2,151,857 | Manz | Mar. 28, 1939 |
| 2,224,144 | Dickey et al. | Dec. 10, 1940 |
| 2,261,175 | McNally | Nov. 4, 1941 |
| 2,347,704 | McNally | May 2, 1944 |
| 2,406,004 | Dickey et al. | Aug. 20, 1946 |